United States Patent
Nanami

(10) Patent No.: US 9,522,656 B2
(45) Date of Patent: Dec. 20, 2016

(54) VEHICLE CONTROLLER

(75) Inventor: Takeshi Nanami, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/372,859

(22) PCT Filed: Jan. 25, 2012

(86) PCT No.: PCT/JP2012/051568
§ 371 (c)(1),
(2), (4) Date: Jul. 17, 2014

(87) PCT Pub. No.: WO2013/111288
PCT Pub. Date: Aug. 1, 2013

(65) Prior Publication Data
US 2014/0336917 A1   Nov. 13, 2014

(51) Int. Cl.
G06F 17/10 (2006.01)
B60T 7/12 (2006.01)
G08G 1/16 (2006.01)
B60T 7/22 (2006.01)
B60T 8/1755 (2006.01)

(52) U.S. Cl.
CPC .. *B60T 7/12* (2013.01); *B60T 7/22* (2013.01); *B60T 8/17558* (2013.01); *G08G 1/165* (2013.01); *G08G 1/166* (2013.01); *B60T 2201/022* (2013.01)

(58) Field of Classification Search
CPC .............. B60W 2250/306; B60T 2201/08; B60T 8/17557; B60T 2201/022

USPC ........... 701/36, 70, 301; 303/140, 145, 146; 340/435, 436, 903, 905, 937
See application file for complete search history.

(56) References Cited

U.S. PATENT DOCUMENTS

| | | | |
|---|---|---|---|
| 7,099,759 B2* | 8/2006 | Ghoneim | 701/41 |
| 7,562,948 B2* | 7/2009 | Matsumoto et al. | 303/146 |
| 8,774,689 B2* | 7/2014 | Shida | 399/312 |
| 2004/0030497 A1 | 2/2004 | Knoop et al. | |
| 2005/0236895 A1* | 10/2005 | Matsumoto et al. | 303/140 |
| 2008/0015778 A1 | 1/2008 | Matsuura et al. | |

FOREIGN PATENT DOCUMENTS

| | | |
|---|---|---|
| JP | 2000-198402 A | 7/2000 |
| JP | 2000-298800 A | 10/2000 |

(Continued)

*Primary Examiner* — Gertrude Arthur Jeanglaud
(74) *Attorney, Agent, or Firm* — Sughrue Mion, PLLC

(57) ABSTRACT

A vehicle controller includes: a collision preventing unit that performs a collision avoiding operation of a vehicle with an object around the vehicle, an operation of the collision preventing unit being suppressed when turning behavior of the vehicle is detected; and a control unit that controls the operation of the collision preventing unit so as not to suppress the operation of the collision preventing unit when the vehicle is decelerated. In the vehicle controller 1, the suppression of the operation of the collision preventing unit is alleviated when the vehicle pitches due to deceleration to cause a yaw rate. Accordingly, it is possible to avoid unnecessary suppression of an operation of a collision preventing device due to the pitching of the vehicle when the vehicle is decelerated and to avoid occurrence of a situation in which the suppression of the operation is unnecessarily performed.

5 Claims, 3 Drawing Sheets

(56) References Cited

FOREIGN PATENT DOCUMENTS

| | | |
|---|---|---|
| JP | 2002-019490 A | 1/2002 |
| JP | 2008-018832 A | 1/2008 |
| JP | 2010-015450 A | 1/2010 |
| WO | 03/007271 A2 | 1/2003 |

* cited by examiner

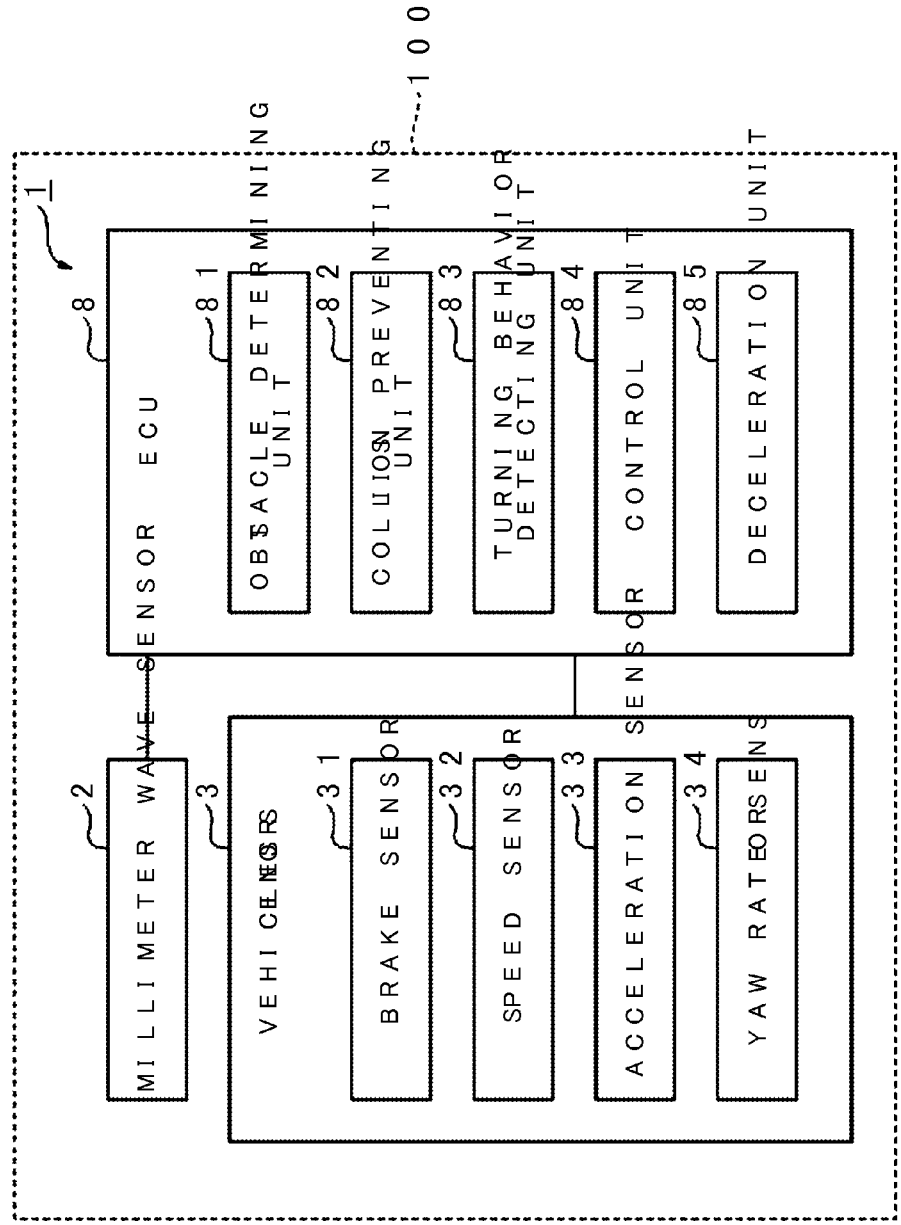

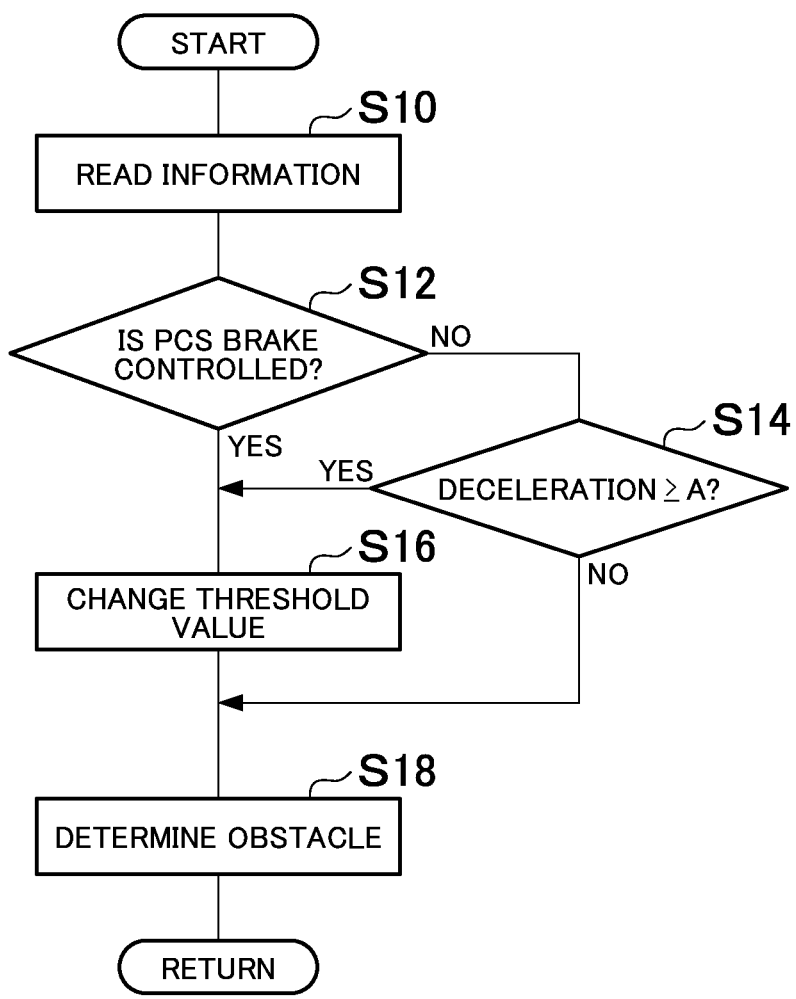

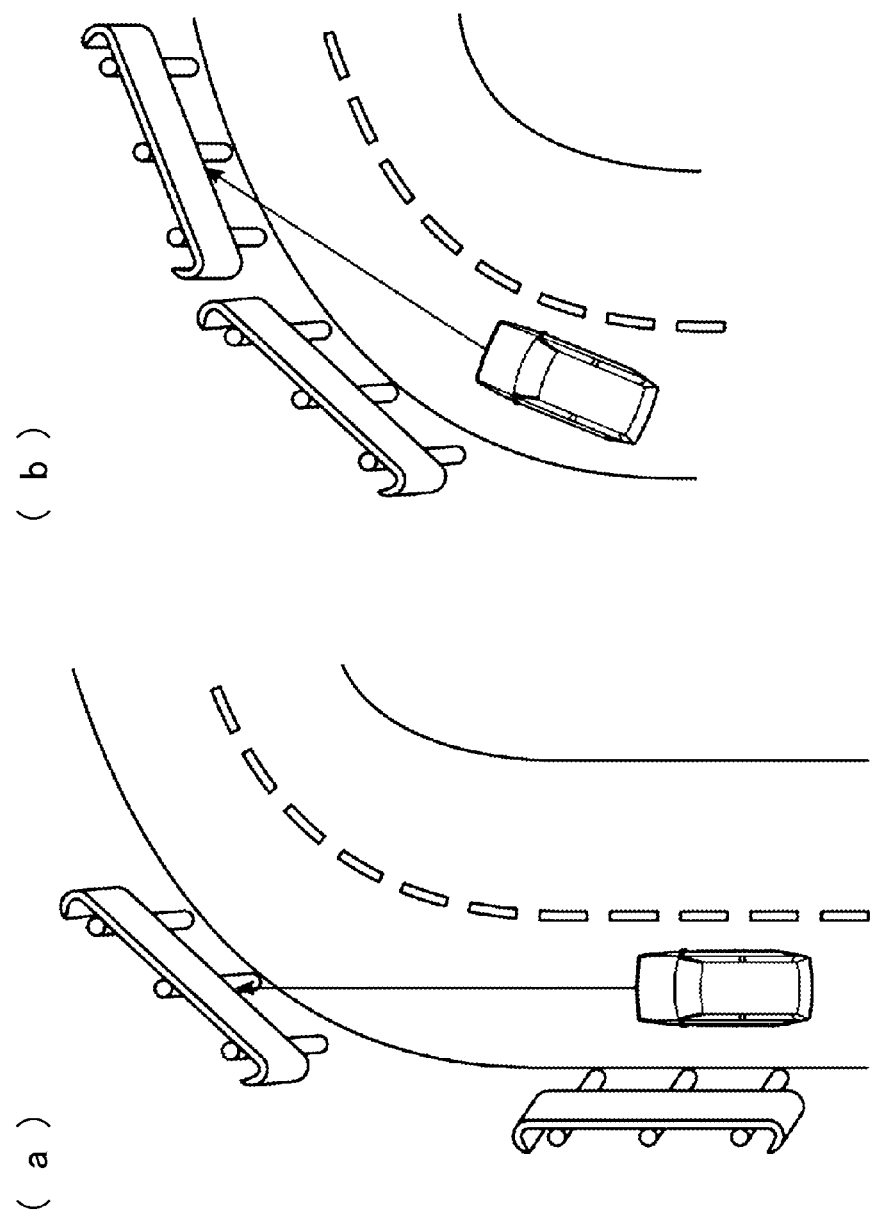

VEHICLE CONTROLLER

TECHNICAL FIELD

The present invention relates to a vehicle controller including a collision preventing device.

BACKGROUND ART

In the related art, a vehicle controller is known which includes a collision preventing device performing a collision avoiding operation. Regarding such a type of vehicle controller, for example, PTL 1 (Japanese Patent Application Publication No. 2010-015450 (JP 2010-015450 A) discloses a technique of controlling a collision preventing device so as to make it difficult to perform a collision avoiding operation when a vehicle takes turning behavior, thereby preventing an object on a curved road side such as a guard rail from being erroneously detected as an obstacle.

CITATION LIST

Patent Literature

PTL 1: Japanese Patent Application Publication No. 2010-015450 (JP 2010-015450 A)
PTL 2: Japanese Patent Application Publication No. 2000-298800 (JP 2000-298800 A)
PTL 3: Japanese Patent Application Publication No. 2000-198402 (JP 2000-198402 A)
PTL 4: Japanese Patent Application Publication No. 2008-018832 (JP 2008-018832 A)

SUMMARY OF THE INVENTION

Technical Problem

When a vehicle pitches due to deceleration to thereby cause a yaw rate, this behavior may be detected as turning behavior. Here, by making it difficult to perform a collision avoiding operation at the time of turning behavior as described above, the operation of the collision preventing device may be unnecessarily suppressed, for example, when the vehicle is decelerated at the time of traveling straight. In this way, the vehicle controller in the related art has room for improvement in accuracy of determination of whether to suppress the operation of the collision preventing device.

Therefore, an object of the present invention is to provide a vehicle controller with improved accuracy of determination of whether to suppress an operation of a collision preventing device.

Solution to Problem

In order to achieve the above-mentioned object, according to the present invention, there is provided a vehicle controller including: a collision preventing unit that performs a collision avoiding operation of a vehicle with an object around the vehicle, an operation of the collision preventing unit being suppressed when turning behavior of the vehicle is detected; and a control unit that controls the operation of the collision preventing unit so as not to suppress the operation of the collision preventing unit when the vehicle is decelerated.

In the vehicle controller according to the present invention, the control unit controls the collision preventing unit so as not to suppress the operation of the collision preventing unit when the vehicle is decelerated. Accordingly, even when the vehicle pitches due to deceleration to cause a yaw rate and the yaw rate is detected as turning behavior, it is not difficult to perform a collision avoiding operation. As a result, since a situation in which the operation of the collision preventing unit is unnecessarily suppressed can be avoided, it is possible to improve accuracy of determination of whether to suppress an operation of a collision preventing device.

In the vehicle controller according to the present invention, it is preferable that the control unit control the operation of the collision preventing unit so as not to suppress the operation of the collision preventing unit when the deceleration of the vehicle is greater than or equal to a reference value. According to this invention, when the deceleration of the vehicle is greater than or equal to the reference value, it is not difficult to cause the collision preventing unit to operate and it is thus possible to avoid unnecessary suppression of an operation due to deceleration.

In the vehicle controller according to the present invention, it is preferable that the control unit control the operation of the collision preventing unit so as not to suppress the operation of the collision preventing unit when a brake of the vehicle is operated. According to this invention, when a brake operates, it is not difficult to perform the collision avoiding operation and it is thus possible to avoid unnecessary suppression of the operation with a simple configuration.

The vehicle controller according to the present invention may further include a deceleration unit that automatically decelerates the vehicle, and it is preferable that the control unit control the operation of the collision preventing unit so as not to suppress the operation of the collision preventing unit when the deceleration unit decelerates the vehicle. According to this invention, even when a safety system such as a pre-crash safety system (PCS) that performs a collision avoiding control is mounted on the vehicle, it is not difficult to perform the collision avoiding operation at the time of deceleration and it is thus possible to avoid unnecessary suppression of the operation at the time of deceleration, thereby further improving accuracy of determination of whether to suppress the operation of the collision preventing device.

Advantageous Effects

According to the present invention, it is possible to improve accuracy of determination of whether to suppress an operation of a collision preventing device.

BRIEF DESCRIPTION OF THE DRAWINGS

FIG. 1 is a block diagram illustrating a vehicle controller according to an embodiment of the present invention.

FIG. 2 is a flowchart illustrating an obstacle determining process that is performed by the vehicle controller illustrated in FIG. 1.

FIG. 3 is a diagram illustrating a situation in which an operation of a collision preventing unit is suppressed.

MODES FOR CARRYING OUT THE INVENTION

Hereinafter, an exemplary embodiment of the present invention will be described with reference to the accompanying drawings. In the below description, identical or corresponding elements will be referenced by identical reference signs and description thereof will not be repeated.

As illustrated in FIG. 1, a vehicle controller 1 according to this embodiment has a PCS function, which is mounted on a vehicle 100, of detecting information of the surroundings of the vehicle 100 and a traveling state of the vehicle 100 and preventing a collision with an object around the vehicle 100. The vehicle controller 1 includes a collision preventing unit 82 that performs a collision avoiding operation of the vehicle 100 with an object around the vehicle 100 and suppresses an operation of the collision preventing unit 82 when turning behavior of the vehicle 100 is detected. The vehicle controller 1 includes a control unit 84 that controls the operation of the collision preventing unit 82 so as not to suppress the operation of the collision preventing unit 82 when the vehicle 100 is decelerated. The collision preventing unit 82 and the control unit 84 are mounted on, for example, an electronic control unit (ECU) 8. The vehicle controller 1 includes, for example, a millimeter wave sensor 2, a vehicle sensor 3, and an ECU 8.

The millimeter wave sensor 2 serves as a radar detecting unit that receives reflected waves of RF waves emitted therefrom and that acquires a detection point of an object around the vehicle 100. The millimeter wave sensor 2 is mounted, for example, on the front part and the lateral parts of the vehicle 100, scans the front side and the lateral sides of the vehicle 100 with RF waves of a millimeter wavelength band, and receives RF waves reflected from the surface of an object that is present around the vehicle 100. Accordingly, the millimeter wave sensor 2 recognizes a target as a reflection point of RF waves. The millimeter wave sensor 2 acquires target information (radar target information) from transmission and reception data of the millimeter waves.

The radar target information includes, for example, a transverse position of a target, a distance between the vehicle 100 and the target, and a relative velocity between the vehicle 100 and the target. The millimeter wave sensor 2 is connected to the ECU 8 and the radar target information acquired by the millimeter wave sensor 2 is input to the ECU 8.

The vehicle sensor 3 serves as a traveling state detecting unit that detects a traveling state of the vehicle 100. The vehicle sensor 3 includes, for example, a brake sensor 31, a speed sensor 32, an acceleration sensor 33, and a yaw rate sensor 34. The vehicle sensor 3 is connected to the ECU 8 and the traveling state of the vehicle 100 acquired by the vehicle sensor 3 is input to the ECU 8.

The brake sensor 31 has a function of detecting whether a brake pedal is operated by a driver of the vehicle 100. The brake sensor 31 detects an operating state of the brake pedal by the driver and transmits the detected operating state of the brake pedal as a brake signal to the ECU 8.

The speed sensor 32 has a function of detecting the speed of the vehicle 100 and is disposed, for example, on the wheels of the vehicle 100. The speed sensor 32 detects, for example, the rotation speed of the vehicle wheels and calculates the vehicle speed of the vehicle 100 from the detected rotation speed. The speed sensor 32 transmits the detected vehicle speed of the vehicle 100 to the ECU 8.

The acceleration sensor 33 has a function of detecting acceleration and deceleration of the vehicle 100. The acceleration sensor 33 is disposed, for example, in the front part of the vehicle 100 and detects acceleration and deceleration in the front-rear direction of the vehicle 100 and acceleration and deceleration in the transverse direction. The acceleration sensor 33 transmits the detected acceleration and deceleration to the ECU 8.

The yaw rate sensor 34 has a function of detecting the yaw rate of the vehicle 100. The yaw rate sensor 34 transmits the detected yaw rate as a yaw rate signal to the ECU 8.

The ECU 8 has a PCS function of determining whether an obstacle is present around the vehicle 100 on the basis of the information pieces acquired by the millimeter wave sensor 2 and the vehicle sensor 3 and performing a collision avoiding operation when it is determined that an obstacle is present. The ECU 8 is a computer including a central processing unit (CPU) and a memory such as a read only memory (ROM) and a random access memory (RAM) and includes an input signal circuit, an output signal circuit, and a power supply circuit. The ECU 8 is embodied, for example, by loading an application stored in the ROM into the RAM and causing the CPU to execute the loaded application.

A vehicle controller in the related art will be described below as a comparative example with the vehicle controller 1 according to this embodiment. In a collision avoiding operation in the related art, for example, when a vehicle is located at a starting point of a curve and is about to travel along the curve as illustrated in part (a) of FIG. 3 or when a vehicle travels along a curve as illustrated in part (b) of FIG. 3, an object on the roadside such as a guard rail may be erroneously detected as an obstacle. In order to prevent the erroneous detection, the vehicle controller in the related art suppresses the operation of the collision preventing device so as to make it difficult to perform the collision avoiding operation when the vehicle takes turning behavior.

When the vehicle is decelerated, the vehicle may pitch to increase the yaw rate and this behavior may be detected as turning behavior. Accordingly, when the operation of the collision preventing device is suppressed with the turning behavior of the vehicle as described above, the operation is suppressed due to only the pitching based on the deceleration even at the time of straight traveling of the vehicle and it is difficult to perform the collision avoiding operation. In this way, the vehicle controller in the related art has a problem in that the operation of the collision preventing device is unnecessarily suppressed.

Therefore, in the vehicle controller 1 according to this embodiment, as illustrated in FIG. 1, the ECU 8 includes an obstacle determining unit 81, the collision preventing unit 82, a turning behavior detecting unit 83, the control unit 84, and a deceleration unit 85. In order to solve the problem in that the operation of the collision preventing unit is unnecessarily suppressed, the control unit 84 controls the operation of the collision preventing unit 82 so as not to suppress the operation of the collision preventing unit 82 at the time of deceleration of the vehicle. The obstacle determining unit 81, the collision preventing unit 82, the turning behavior detecting unit 83, the control unit 84, and the deceleration unit 85 are not incorporated into the same ECU 8 as described above, but may be incorporated into different ECUs.

The obstacle determining unit 81 detects an object around the vehicle 100 from the information acquired by the millimeter wave sensor 2 and determines whether an obstacle is present around the vehicle 100 using the traveling state acquired by the vehicle sensor 3. Specifically, the obstacle determining unit 81 calculates a degree of collision risk of the vehicle 100 with an object around the vehicle 100 using the information acquired by the millimeter wave sensor 2 and the vehicle sensor 3, and determines that an obstacle is present, for example, when the degree of collision risk is greater than or equal to a predetermined threshold value. For example, a transverse position of an object around the vehicle 100 can be used as the information acquired by the millimeter wave sensor 2. In this case, it is determined that an obstacle is present when the transverse position detected by the millimeter wave sensor 2 is less than a predetermined threshold value and it is determined that an obstacle is not present when the transverse position is greater than or equal to the predetermined threshold value.

The collision preventing unit 82 performs a collision avoiding operation of the vehicle 100 with an obstacle around the vehicle 100. The collision preventing unit 82 outputs, for example, a warning to a driver of the vehicle 100 when the obstacle determining unit 81 determines that an obstacle is present around the vehicle 100. Examples of the collision avoiding operation that is performed by the collision preventing unit 82 include deceleration of the vehicle 100 by the deceleration unit 85 and fastening of a seat belt.

The turning behavior detecting unit 83 has a function of detecting turning behavior of the vehicle 100. The turning behavior detecting unit 83 detects the turning behavior on the basis of the traveling state of the vehicle 100 acquired by the vehicle sensor 3. Specifically, for example, when the vehicle 100 turns and the yaw rate detected by the yaw rate sensor 34 is greater than or equal to a predetermined value, the turning behavior detecting unit 83 detects the turning as the turning behavior.

The control unit 84 serves to control the operation of the collision preventing unit 82 and controls the collision preventing unit 82 so as not to suppress the operation of the collision preventing unit 82 when the vehicle 100 is decelerated. Specifically, the control unit 84 sets a determination threshold value of the obstacle determining unit 81 and changes the determination threshold value of the obstacle determining unit 81 so as to make it difficult to cause the collision preventing unit 82 to operate when the turning behavior is detected and so as to make it easy to cause the collision preventing unit 82 to operate when the vehicle 100 is decelerated. For example, when the transverse position is used as the determination threshold value, the control unit 84 controls the operation of the collision preventing unit 82 so as to decrease the determination threshold value to make it difficult to determine that an obstacle is present when the turning behavior is detected and so as to increase the determination threshold value to make it easy to determine that an obstacle is present when the vehicle 100 is decelerated.

The control unit 84 controls the operation of the collision preventing unit 82 so as not to suppress the operation of the collision preventing unit 82 when the brake of the vehicle 100 is operated. Here, the operation of the brake of the vehicle 100 may be a driver's operation of the brake detected by the brake sensor 31 or may be a braking operation that is automatically performed.

The deceleration unit 85 has a function of automatically decelerating the vehicle 100. The deceleration unit 85 performs a kind of collision avoiding operation of the PCS and decelerates the vehicle 100 when the obstacle determining unit 81 determines that an obstacle is present.

The operation of the vehicle controller 1 according to this embodiment will be described below with reference to FIG. 2. The process illustrated in FIG. 2 is performed by the ECU 8 and is an obstacle determining process of determining whether an obstacle is present around the vehicle 100. The obstacle determining process is repeatedly performed every predetermined period of time, for example, while the vehicle 100 travels.

First, in step S10 (hereinafter, referred to as "S10". The same is true of the other steps.), a process of reading a variety of information is performed. Specifically, the detection results of the millimeter wave sensor 2 and the vehicle sensor 3 are transmitted to the ECU 8 and are stored in the memory of the ECU 8. After the process of S10 is finished, the process of S12 is performed.

In S12, a brake operation determining process of determining whether the brake operates is performed. Specifically, it is determined whether the automatic brake is operated by the deceleration, unit 85. Here, the process of S14 is performed when it is determined that the automatic brake is not operated, and the process of S16 is performed when it is determined that the automatic brake is operated. Instead of determining whether the automatic brake is operated by the deceleration unit 85 in S12, it may be determined whether the brake is operated by the driver of the vehicle 100.

In S14, a deceleration determining process of determining whether the deceleration of the vehicle 100 is greater than or equal to a reference value is performed. Specifically, the ECU 8 detects the deceleration of the vehicle 100 on the basis of the detection result of the acceleration sensor 33 and it is determined whether the deceleration of the vehicle 100 is greater than or equal to a threshold value A. Here, the process of S16 is performed when it is determined that the deceleration is greater than or equal to the threshold value A, and the process of S18 is performed when it is determined that the deceleration is less than the threshold value A. The value of the threshold value A is not particularly limited, but may be set to, for example, 0.3 [G]. The value of the threshold value A may be appropriately calculated, for example, on the basis of the relationship of the deceleration and the pitching angle of the vehicle 100 and the vertical angle of millimeter waves.

In S16, a threshold value setting process is performed by the control unit 84. Specifically, the threshold value is set by the control unit 84 so as to make it easy for the collision preventing unit 82 to perform the collision avoiding operation. For example, when the obstacle determining process is performed on the basis of the transverse position, the control unit 84 sets the threshold value to a greater value and, for example, the threshold value of ±0.5 [m] is changed to ±1.0 [m]. This change of the threshold value makes it easy to determine that an obstacle is present and makes it easy for the collision preventing unit 82 to perform the collision avoiding operation. After the process of S16 is finished, the process of S18 is performed.

In S18, an obstacle determining process is performed by the obstacle determining unit 81. Specifically, the obstacle determining unit 81 determines whether an obstacle is present by comparing the detection results of the millimeter wave sensor 2 and the vehicle sensor 3 with the threshold value. For example, when it is determined whether an obstacle is present on the basis of the transverse position, the obstacle determining unit 81 determines that an obstacle is present when the transverse position of an object around the vehicle 100 is less than or equal to the threshold value, and determines that an obstacle is not present when the transverse position is greater than the threshold value. When it is determined that an obstacle is present, the collision avoiding operation is performed by the collision preventing unit 82. For example, the deceleration of the vehicle 100 by the deceleration unit 85, the warning to the driver of the vehicle 100, or fastening of a seat belt, is performed. After the process of S18 is finished, the flow of the processes ends.

As described above, in this embodiment, the vehicle controller 1 includes the collision preventing unit 82 that performs the collision avoiding operation of the vehicle 100 with an object around the vehicle 100, in which the operation of the collision preventing unit 82 is suppressed when the turning behavior of the vehicle 100 is detected, and the control unit 84 that controls the operation of the collision preventing unit 82 so as not to suppress the operation of the collision preventing unit 82 when the vehicle 100 is decelerated.

As described above, the vehicle controller 1 according to this embodiment controls the operation of the collision preventing unit so as not to make it difficult to perform the collision avoiding operation when the vehicle 100 is decelerated. Accordingly, when the vehicle pitches due to the deceleration and this behavior is detected as turning behavior, the suppression of the operation of the collision preventing unit 82 is alleviated. As a result, since a situation in which the operation of the collision preventing unit 82 is unnecessarily suppressed can be avoided at the time of deceleration of the vehicle 100 or the like, it is possible to improve accuracy of determination of whether to suppress the operation of the collision preventing unit 82.

In the vehicle controller 1 according to this embodiment, the control unit 84 includes the control unit 84 that controls the operation of the collision preventing unit 82 so as not to suppress the operation of the collision preventing unit 82 when the deceleration of the vehicle 100 is greater than or equal to the threshold value A. Accordingly, when the deceleration of the vehicle 100 is greater than or equal to the threshold value A, the suppression of the operation of the collision preventing unit 82 is alleviated and it is thus possible to avoid unnecessary suppression of the operation.

In the vehicle controller 1 according to this embodiment, the control unit 84 controls the operation of the collision preventing unit 82 so as not to suppress the operation of the collision preventing unit 82 when the brake of the vehicle 100 is operated. Accordingly, when the brake is operated, the suppression of the operation of the collision preventing unit 82 is alleviated and it is thus possible to avoid unnecessary suppression of the operation with a simple configuration.

The vehicle controller 1 according to this embodiment includes the deceleration unit 85 that automatically decelerates the vehicle 100, and the control unit 84 controls the operation of the collision preventing unit 82 so as not to suppress the operation of the collision preventing unit 82 when the deceleration unit 85 decelerates the vehicle 100. Accordingly, even when a safety system such as a PCS of performing a collision avoiding control is mounted on the vehicle, it is not difficult to perform the collision avoiding operation at the time of deceleration and it is thus possible to avoid unnecessary suppression of the operation.

The above-mentioned embodiment is an example of the vehicle controller according to the present invention, and the vehicle controller according to the present invention is not limited to the embodiment. The vehicle controller according to the present invention can be modified without changing the gist of the appended claims, or may be applied to other devices.

For example, the above-mentioned embodiment describes that two determinations of the determination of whether the PCS brake operates and the determination of whether the deceleration of the vehicle 100 is greater than or equal to the threshold value A are performed as illustrated in S12 and S14 of FIG. 2, but only one of the determinations may be performed.

The above-mentioned embodiment describes the example where the control unit 84 changes the determination threshold value of the obstacle determining unit 81 so as to make it easy for the collision preventing unit 82 to perform the collision avoiding operation when the brake is operated or the deceleration of the vehicle 100 is greater than or equal to the threshold value A. However, the technique of making it easy to perform the collision avoiding operation is not limited to this example. For example, the determination threshold value may be calculated on the basis of at least one of the deceleration of the vehicle 100 and the brake operation state of the vehicle 100 and the threshold value may be dynamically set in each case. Accordingly, it is possible to control the operation of the collision preventing unit 82 with higher accuracy. The control unit 84 may alleviate the suppression of the operation of the collision preventing unit 82 at the time of deceleration without using the threshold value.

The above-mentioned embodiment describes the example where the millimeter wave sensor 2 is used, but a sensor using RF waves of a different wavelength band such as a sensor using microwaves or sub millimeter waves may be used instead of the millimeter wave sensor 2. Any sensor may be used instead of the millimeter wave sensor 2, as long as it can measure the positional relationship between the vehicle 100 and an object around the vehicle 100.

REFERENCE SIGNS LIST

1: vehicle controller
2: millimeter wave sensor
3: vehicle sensor
8: ECU
31: brake sensor
32: speed sensor
33: acceleration sensor
34: yaw rate sensor
81: obstacle determining unit
82: collision preventing unit
83: turning behavior detecting unit
84: control unit
85: deceleration unit
100: vehicle
A: threshold value

The invention claimed is:

1. A vehicle controller comprising:
a collision preventing unit that performs a collision avoiding operation of a vehicle with an object around the vehicle, wherein an operation of the collision preventing unit is suppressed when a yaw rate detected by a yaw rate sensor is greater than or equal to a predetermined value; and
a control unit that controls the operation of the collision preventing unit so as not to suppress the operation of the collision preventing unit when the vehicle is decelerated.

2. The vehicle controller according to claim 1, wherein the control unit controls the operation of the collision preventing unit so as not to suppress the operation of the collision preventing unit when the deceleration of the vehicle is greater than or equal to a reference value.

3. The vehicle controller according to claim 1, wherein the control unit controls the operation of the collision preventing unit so as not to suppress the operation of the collision preventing unit when a brake of the vehicle is operated.

4. The vehicle controller according to claim 1, further comprising a deceleration unit that automatically decelerates the vehicle,
wherein the control unit controls the operation of the collision preventing unit so as not to suppress the operation of the collision preventing unit when the deceleration unit decelerates the vehicle.

5. A vehicle controller comprising:
an electronic control unit including program logic configured to:
perform a collision avoiding operation of a vehicle with an object around the vehicle, wherein the collision avoiding operation is suppressed when a yaw rate detected by a yaw rate sensor is greater than or equal to a predetermined value; and
control the collision avoiding operation of the vehicle so as not to suppress the operation when the vehicle is decelerated.

\* \* \* \* \*